United States Patent [19]

Backström et al.

[11] 3,945,874

[45] Mar. 23, 1976

[54] METHOD OF ASSEMBLING HUBS, PARTICULARLY PROPELLER HUBS FOR BOAT ENGINES

[75] Inventors: Karl Gustaf Backström, Charlottenberg; Kjell-Idar Borgersen, Ytterby, both of Sweden

[73] Assignee: AB Volvo Penta, Goteborg, Sweden

[22] Filed: Aug. 5, 1974

[21] Appl. No.: 494,865

Related U.S. Application Data

[63] Continuation of Ser. No. 287,040, Sept. 7, 1972, abandoned.

[52] U.S. Cl. ..................... 156/294; 29/436; 29/447
[51] Int. Cl.² ......................................... B32B 31/04
[58] Field of Search ............. 156/86, 293, 294, 338; 29/434, 436, 447, 450, 451

[56] References Cited
UNITED STATES PATENTS

| | | | |
|---|---|---|---|
| 2,154,077 | 4/1939 | Sampson | 29/436 |
| 3,387,839 | 6/1968 | Miller et al. | 156/294 |

*Primary Examiner*—Caleb Weston
*Attorney, Agent, or Firm*—Newton, Hopkins & Ormsby

[57] ABSTRACT

A method of facilitating assembly of hubs, particularly hubs intended for boat engines and being of the kind comprising an outer sleeve, e.g. a propeller sleeve, a hub sleeve mounted coaxially in said outer sleeve, and a rubber bushing between the inner and outer sleeves. In accordance with the invention, the bushing is mounted on the hub sleeve in a non-vulcanized condition, whereafter the sleeve and rubber bushing unit is positioned in the outer sleeve, whereafter vulcanization is carried out. In addition to facilitating correct positioning of bushing and hub sleeve in the outer sleeve the invention provides the advantages of making specialty tools superfluous for mounting of the hub, making possible to reduce the thickness of the outer sleeve as heavy stresses are no longer exerted on said sleeve during mounting, and making storage easier.

6 Claims, 4 Drawing Figures

METHOD OF ASSEMBLING HUBS, PARTICULARLY PROPELLER HUBS FOR BOAT ENGINES

This is a continuation, of application Ser. No. 287,040 filed Sept. 7, 1972.

BACKGROUND OF THE INVENTION

The present invention concerns a method of assembling hubs.

Propeller hubs for boat engines usually consist of a propeller sleeve on which are mounted the propeller blades, a hub sleeve which is arranged coaxially with the propeller sleeve and in which is insertable the propeller shaft, and a rubber bushing positioned between the propeller sleeve and the hub sleeve, said rubber bushing being arranged to absorb torsional stresses and, on account of its elasticity, to protect the propeller and power transmission means, particularly from the stresses occuring from heavy thrusts as may occur for various reasons.

In assemblying a hub unit of this kind certain problems have hitherto presented themselves on account of the inappropriate way in which the task has been performed. Initially, the rubber bushing was secured to the hub sleeve through vulcanization. Then, the bushing together with the hub sleeve were forced into the propeller sleeve while compressing the bushing radially, and in its compressed state, as desired, the bushing contacted the inner surface of the propeller sleeve with considerable friction.

This method is inadvantageous in that specialty tools are required to perform the assembly and considerable force necessary to urge the bushing into the propeller sleeve. In order to be able to withstand the stresses exerted on it during this work, the propeller sleeve in addition had to have a considerable material thickness. Since the bushing in its compressed state, as mentioned, offers large friction against the propeller sleeve, it was furthermore difficult to orientate the hub sleeve and the bushing correctly in the propeller sleeve.

SUMMARY OF THE INVENTION

The present invention provides a novel and simplified method of assembling hubs comprising, as mentioned above, an outer sleeve, and a hub sleeve mounted coaxially with said outer sleeve, and a rubber bushing between said two sleeves to absorb torsional stresses occuring between the outer sleeve and the hub sleeve. Characteristic of the invention is that the rubber bushing is threaded in an unvulcanized state over the hub sleeve, whereafter bushing and sleeve are together placed in their correct positions in the outer sleeve, whereupon the bushing is vulcanized. Owing to this novel method of assembly, the mounting may be performed quicker, easier and at lower costs.

BRIEF DESCRIPTION OF THE DRAWINGS

Various embodiments of the invention will be described in the following in detail with reference to the accompanying drawings, wherein.

DETAILED DESCRIPTION OF A PREFERRED EMBODIMENT

Figure 1:
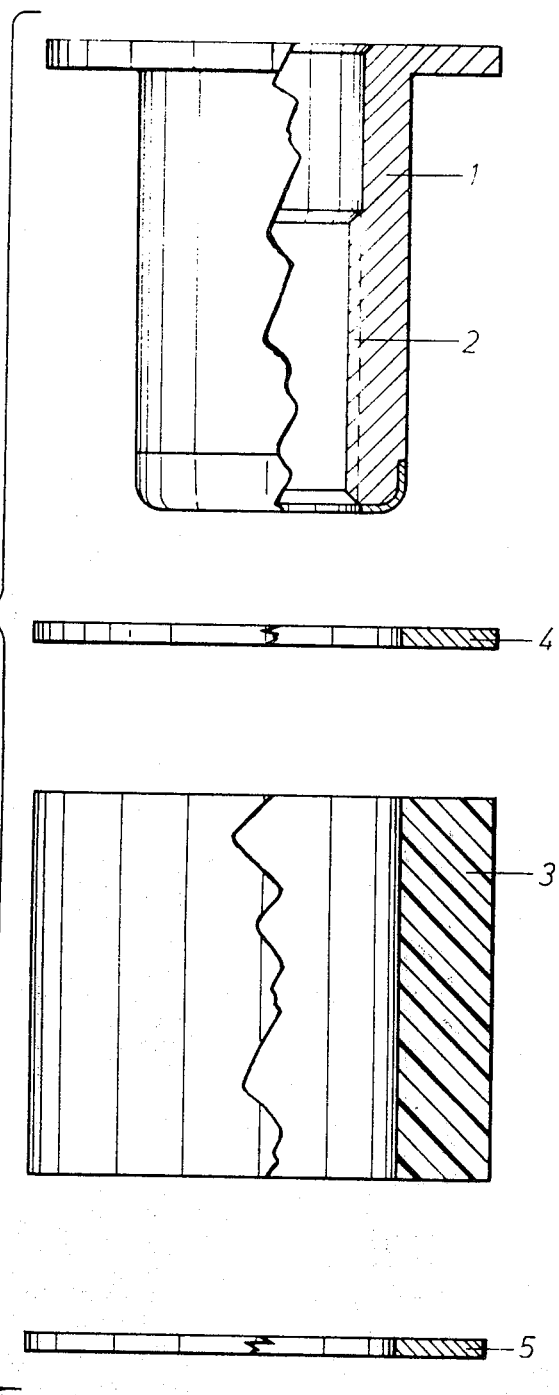
FIG. 1 illustrates a hub sleeve, a rubber bushing, and a couple of washers.

FIG. 1 illustrates a hub sleeve 1 intended for a propeller hub for a boat engine. The hub sleeve 1 is arranged to be threaded onto the end of a propeller shaft and is provided with splines 2 for transmission of the rotational forces of the propeller shaft. An unvulcanized rubber bushing 3 may be threaded onto the hub sleeve 1. Preferably washers 4, 5 are mounted on either side of the bushing 3.

Figure 2:
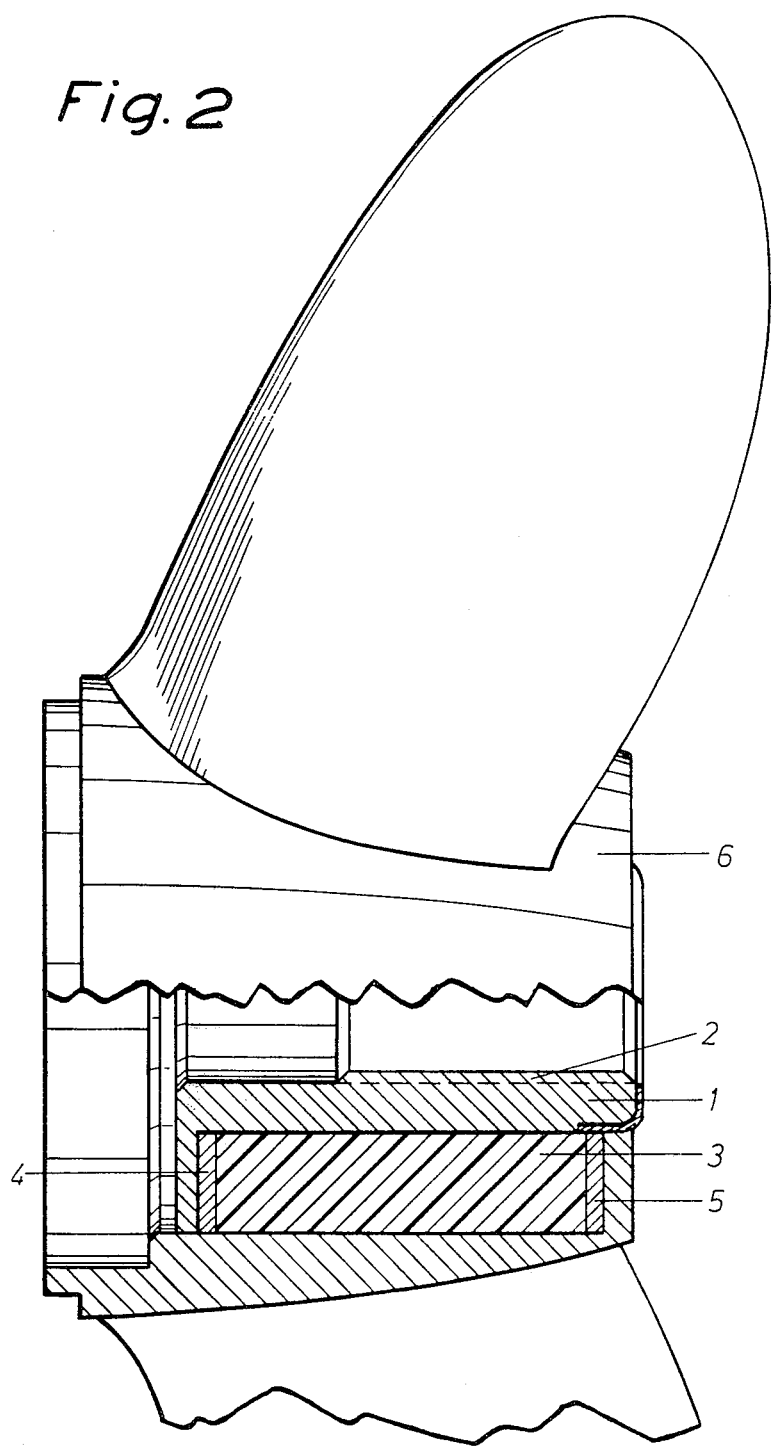
FIG. 2 shows the details mentioned as mounted in a propeller sleeve.

When performing the assembling method in accordance with the present invention, the washer 4, the unvulcanized bushing 3, and the washer 5 are threaded in the order mentioned on the hub sleeve 1. The parts thus assembled are thereafter inserted into a propeller sleeve 6 (see FIG. 2). This may be performed in a simple and smooth way manually, it being then also an easy task to place the assembled parts in the exactly correct position in the propeller sleeve 6. The rubber bushing 3 is thereafter vulcanized while in correct position in the hub. The rubber material thereby receives its resilient properties while at the same time the inner surface of the bushing is made to adhere to the hub sleeve 1, its outer surface to adhere to the propeller sleeve 6 and its end surfaces to adhere to the washers 4 and 5, respectively.

Upon rotation of the propeller sleeve 6 in relation to the hub sleeve 1, the bushing will be deformed on account of its adherence on the inner and outer surfaces, and upon cease of influence from the rotational forces it will spring back.

Figure 3:
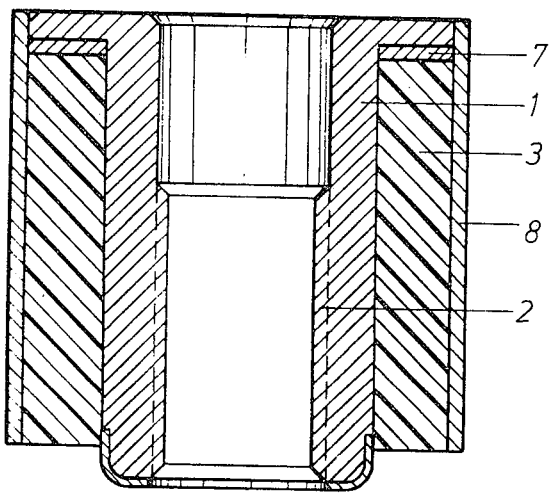
FIG. 3 shows the hub sleeve and the rubber bushing as mounted in a tubular sleeve.

According to the embodiment illustrated in FIG. 3 the hub sleeve 1 and the rubber bushing 3, non-vulcanized, together with a washer 7 are mounted in a tubular sleeve 8. In this position, the bushing 3 is vulcanized, which may be done in a more simple fashion than according to the previous embodiments as the unit is comparatively small and compact. Furthermore, units of this kind are stored with more ease and at lower costs than complete hubs.

Figure 4:
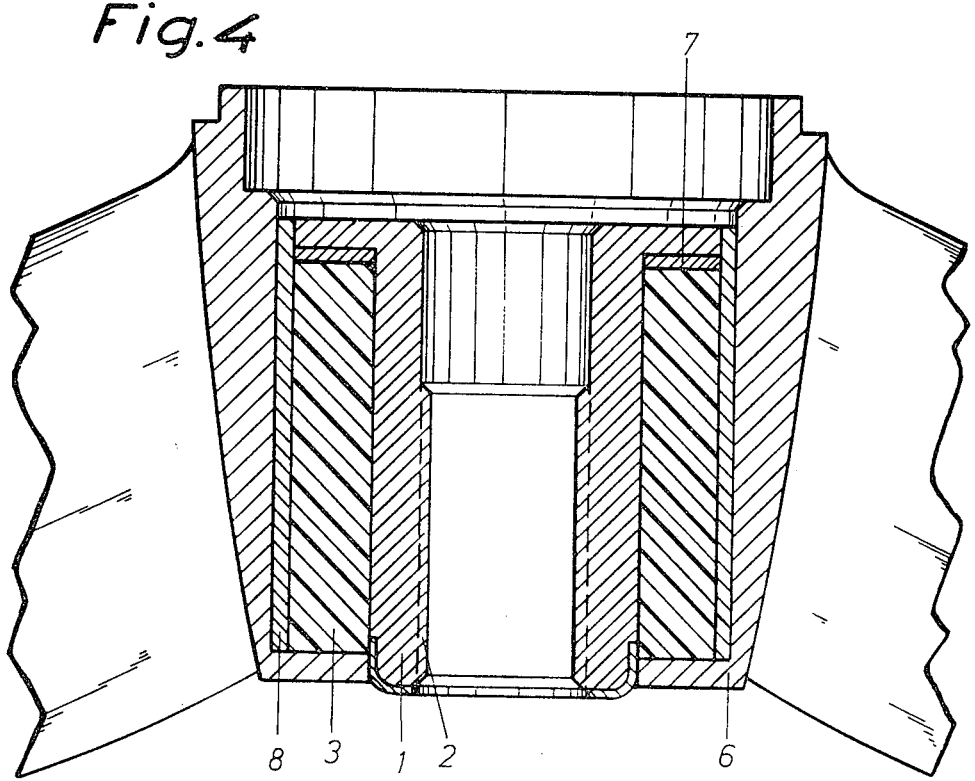
FIG. 4 shows this unit inserted into a propeller sleeve.

The unit consisting of the hub sleeve 1, the rubber bushing 3, the washer 7 and the tubular sleeve 8 is thereafter mounted in the propeller sleeve 6 (see FIG. 4). This may be done for instance by glueing the tubular sleeve 8 to the propeller sleeve 6 by means of some metal glue, such as Araldit. It is also possible to secure the propeller sleeve 6 onto the tubular sleeve 8 by shrinking.

The method in accordance with the invention offers considerable advantages over the technique hitherto known in that no particular tools are required to assemble the hub, that without any difficulty whatsoever the bushing may be aligned and orientated in the hub, and in that the material thickness of the propeller sleeve 6 need not be as considerable as previously, as this sleeve is no longer subjected to extraordinary stresses during assembly.

In the above embodiments a propeller has been chosen to illustrate the invention by way of example. Naturally it is quite possible to apply the method in accordance with the invention also to the hubs incorporated in machines of entirely different constructions.

What we claim is:

1. An improved method of assembling a propeller hub intended for boat engines, said hub comprising a propeller sleeve, a tubular sleeve arranged in said propeller sleeve coaxially therewith, a hub sleeve arranged in said tubular sleeve coaxially therewith, and a rubber bushing disposed between said tubular sleeve and said hub sleeve to absorb torsional stresses occuring between said two sleeves, the improvement comprising threading said rubber bushing in non-vulcanized condition onto said hub sleeve, placing said rubber bushing and said hub sleeve together in correct positions in said tubular sleeve, vulcanizing said bushing to said hub sleeve and to said tubular sleeve, and thereafter securing the assembly within said propeller sleeve.

2. The improved method according to claim 1, the improvement comprising securing said propeller sleeve to said tubular sleeve through gluing.

3. The improved method according to claim 1, the improvement comprising securing said propeller sleeve to said tubular sleeve through shrinking.

4. The method of assembling a propeller hub intended for boat engines, which comprises the steps of:
   a. preforming an unvulcanized rubber mass to a tubular shape to provide a bushing having cylindrical inner and outer surfaces each of selected diameter;
   b. forming a hub sleeve to provide a cylindrical exterior surface of a diameter easily accepting said bushing while maintaining face-to-face contact therebetween;
   c. forming a tubular sleeve to provide cylindrical inner and outer surfaces each of selected diameter, the diameter of said inner surface of the tubular sleeve being such as permits manual insertion of said bushing therewithin and in face-to-face contact therewith when said bushing is received on said hub sleeve;
   d. engaging said bushing onto said exterior surface of the hub sleeve in said face-to-face contact therewith;
   e. manually inserting the interengaged bushing and hub sleeve within said tubular sleeve in said face-to-face contact between the bushing and tubular sleeve;
   f. vulcanizing the hub sleeve-bushing-tubular sleeve assembly to impart resilient properties to said bushing while adhering the bushing to said hub sleeve and to said tubular sleeve; and thereafter
   g. positioning and securing said assembly within the propeller sleeve of a propeller hub to form the completed propeller hub.

5. The method according to claim 4 wherein the securing of step (g) comprises gluing said tubular sleeve within the propeller sleeve.

6. The method according to claim 4 wherein the securing of step (g) comprises shrinking.

* * * * *